F. A. MESSLER & M. BOLLSTROM.
MOTOR VEHICLE.
APPLICATION FILED DEC. 12, 1908.

955,602.

Patented Apr. 19, 1910.
2 SHEETS—SHEET 1.

F. A. MESSLER & M. BOLLSTROM.
MOTOR VEHICLE.
APPLICATION FILED DEC. 12, 1908.

955,602.

Patented Apr. 19, 1910.

2 SHEETS—SHEET 2.

Witnesses
Gertrude Tallman
Clara E. Braden

Inventors
Francis A. Messler
and Maurice Bollstrom
By Chappell Earl
Attorney

UNITED STATES PATENT OFFICE.

FRANCIS A. MESSLER AND MAURICE BOLLSTROM, OF BATTLE CREEK, MICHIGAN.

MOTOR-VEHICLE.

955,602.   Specification of Letters Patent.   Patented Apr. 19, 1910.

Application filed December 12, 1908. Serial No. 467,222.

*To all whom it may concern:*

Be it known that we, FRANCIS A. MESSLER and MAURICE BOLLSTROM, citizens of the United States, residing at Battle Creek, county of Calhoun, and State of Michigan, have invented certain new and useful Improvements in Motor-Vehicles, of which the following is a specification.

This invention relates to improvements in motor vehicles.

The main objects of this invention are, first, to provide in a motor vehicle, an improved driving gear for the steering wheels; second, to provide an improved driving gear for the wheels of motor vehicles, which may be made comparatively light, and, at the same time, strong and durable.

Further objects, and objects relating to structural details, will definitely appear from the detailed description to follow.

We accomplish the objects of our invention by the devices and means described in the following specification.

The invention is clearly defined and pointed out in the claims.

Figure 1:
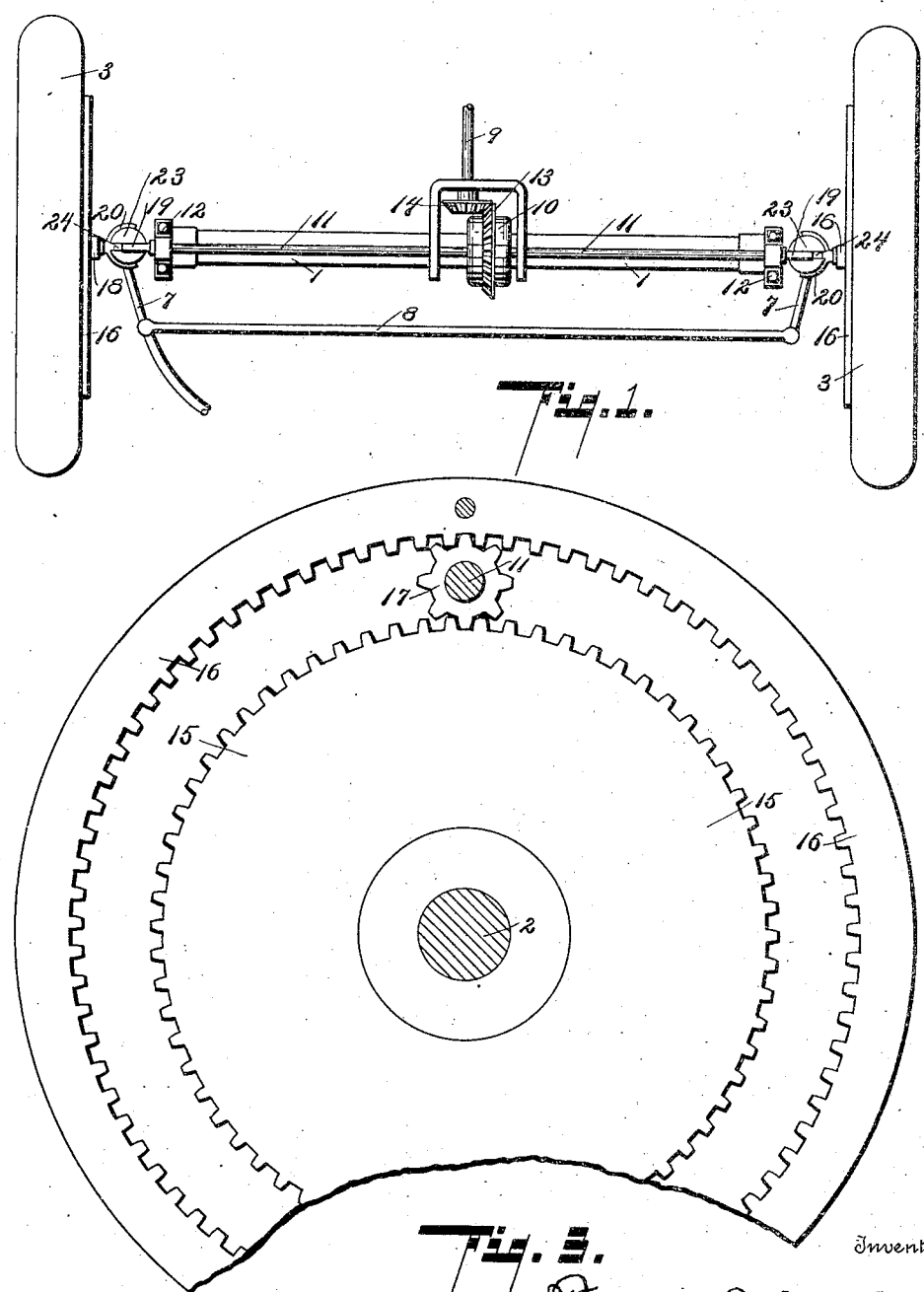
Figure 2:
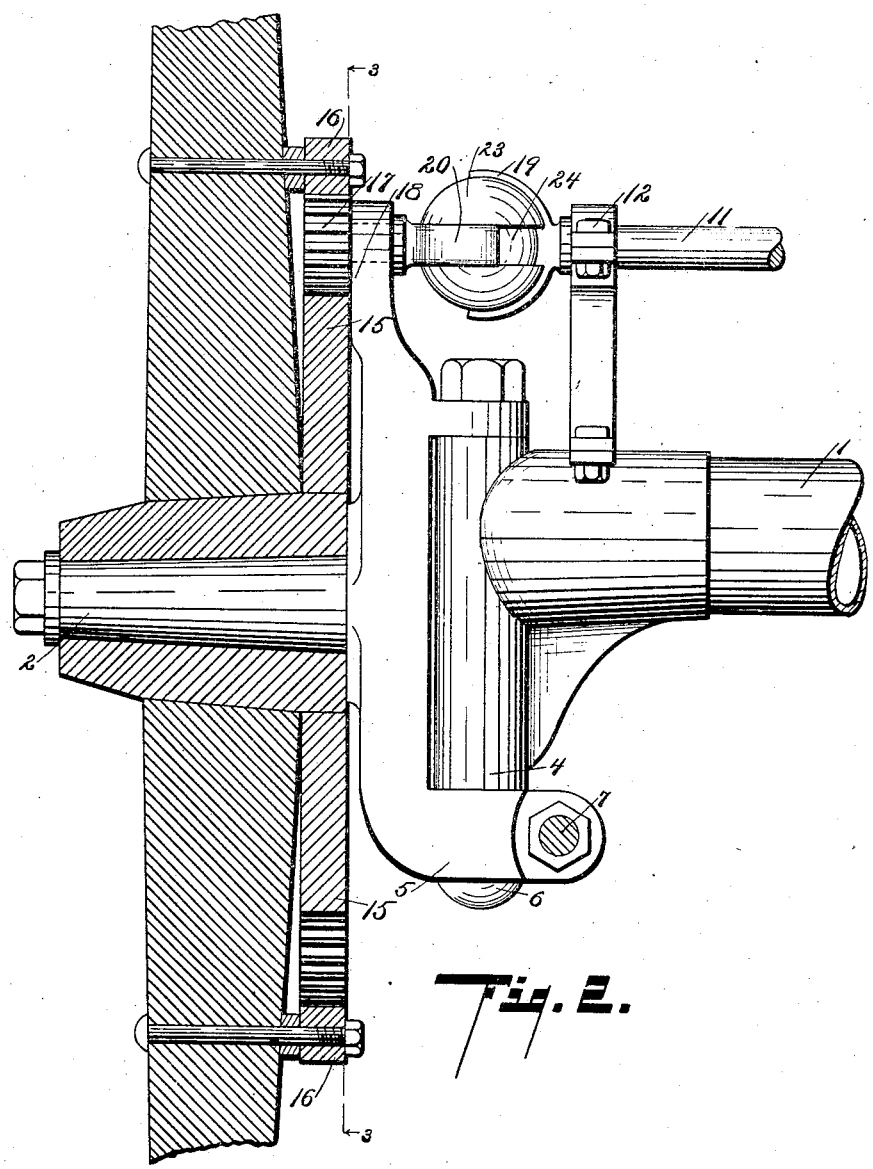

A structure embodying the features of our invention is clearly illustrated in the accompanying drawing, forming a part of this specification, in which;

Figure 1 is a detail plan view of a structure embodying the features of our invention. Fig. 2 is an enlarged detail, partially in vertical section. Fig. 3 is a detail section taken on a line corresponding to line 3—3 of Fig. 2, showing the driving gear connections for the wheels.

In the drawings, similar reference characters refer to similar parts throughout the several views, and the sectional views are taken looking in the direction of the little arrows at the ends of the section lines.

In the accompanying drawing, we have illustrated only such parts of a vehicle as are necessary to fully illustrate our invention. The axle 1 is provided with pivoted spindles 2 for the wheels 3. The pivot for these spindles is preferably in the form of a knuckle 4 on the axle, which is embraced by the yoke-like knuckle 5 of the spindle, the pivot 6 being arranged vertically through the knuckles. These spindles are provided with projecting arms 7, which are connected by a link 8 to be operated together. The driving shaft 9 is connected through the compensating gear 10 to the sections 11—11 of a driven shaft mounted in suitable bearings 12 carried by the axle. As the details of the compensating gear will be readily understood, they are not illustrated herein, they forming no part of our invention, it being sufficient to say that the main gear 13 of the compensating gear meshes with a gear 14 on the driving shaft. On the wheels 3 are external gears 15, and internal gears 16 arranged concentrically so that the gears 17 mesh with both. The gears 15 are loosely mounted and serve to support the gears 17. The gears 17 are mounted in suitable bearings provided in the upwardly-projecting arms 18 on the spindles. The gears 17 are connected to the shaft section 11 by means of a universal joint or coupling, the structure illustrated consisting of a pair of fork members 19 and 20, and a spherically connecting head 23 therefor, having circumferential grooves 24, therein, adapted to receive these forks. By this arrangement, the parts are effectively supported so that the strain thereon is reduced to a minimum, thus permitting the structure to be made comparatively light, and, at the same time, it is strong and durable.

Having thus described our invention, what we claim as new and desire to secure by Letters Patent is:

1. The combination with an axle; wheels; spindles therefor pivoted on said axle, said spindles being provided with upwardly-projecting arms; a driving shaft; a driven shaft made up of sections; compensating gear driving connections for said driving shaft and said driven shaft sections; bearings for said driven shaft sections arranged on said axle; gears; bearings therefor arranged on said upwardly - projecting arms on said spindles; universal joint driving connections for said driven shaft sections and said gears; and internal and external gears on said wheels arranged to mesh with said gears on said spindles.

2. The combination with an axle; wheels; spindles therefor pivoted on said axle; a driving shaft; a driven shaft made up of sections; compensating gear driving connections for said driving shaft and said driven shaft sections; bearings for said driven shaft sections arranged on said axle; gears carried by said spindles; universal joint driving connections for said driven shaft sections and said gears; and internal and external gears on said wheels arranged to mesh with said gears on said spindles.

3. The combination with an axle; wheels; pivoted spindles therefor, said spindles being provided with upwardly-projecting arms; gears; bearings therefor arranged on said upwardly-projecting arms on said spindles; shafts for said gears; bearings therefor carried by said axle; universal joint driving connections for said gears and said shafts; and internal and external gears on said wheels arranged to mesh with said gears on said spindles.

4. The combination with an axle; wheels; pivoted spindles therefor; gears; bearings therefor arranged on said spindles; shafts for said gears; bearings therefor carried by said axle; universal joint driving connections for said gears and said shafts; and internal and external gears on said wheels arranged to mesh with said gears on said spindles.

5. The combination with an axle; wheels; pivoted spindles therefor; gears carried by said spindles; driving connections for said gears embodying universal joints; and internal and external gears on said wheels arranged to mesh with said gears on said spindles.

6. The combination with an axle; wheels; pivoted spindles therefor; driving gears; and internal and external gears on said wheels arranged to mesh with said driving gears.

7. The combination with an axle, of wheels; spindles therefor pivoted on said axle; gears on said wheels; a driving shaft; a driven shaft made up of sections; compensating gear connections for said driving shaft and driven shaft sections; bearings for said driven shaft sections arranged on said axle; gears arranged to mesh with said gears on said wheels; bearings for said last named gears; upwardly-projecting arms on said spindles by which said bearings for said gears are carried, said bearings on said axle and arms being substantially in alinement when the said spindles are in their central position; and universal joint driving connections for said driven shaft sections to said gears mounted on said spindles, the pivotal center of said joint being in alinement with the axes of the pivots for said spindles.

8. The combination with an axle, of wheels; spindles therefor, pivoted on said axle; gears on said wheels; a shaft; bearings for said shaft arranged on said axle; gears arranged to mesh with said gears on said wheels; bearings for said last named gears; upwardly-projecting arms on said spindles, by which said bearings for said gears are carried, said bearings on said axle and arms being substantially in alinement when the said spindles are in their central position; and universal joint driving connections for said driven shaft sections to said gears mounted on said spindles, the pivotal center of said joint being in alinement with the axes of the said pivots for said spindles.

9. The combination with an axle having a knuckle member thereon; a spindle having a pair of knuckle members thereon to embrace said knuckle member of said axle, said spindle having an upwardly-projecting bearing supporting arm; a wheel on said spindle; a gear on said wheel; a gear mounted on said bearing supporting arm arranged to mesh with said gear on said wheel; a shaft for said gear mounted on said spindle and connected thereto by a universal joint connection, said shaft being supported on said axle.

10. The combination with an axle having a knuckle member thereon; a wheel; a spindle therefor having a knuckle member and an upwardly-projecting bearing arm thereon; a pivot for said knuckle member; a gear on said wheel; a shaft and a connecting gear for said shaft to said gear on said wheel journaled in said bearing arm on said spindle, said gear being connected to said shaft by a universal joint, the pivotal center of said joint being in alinement with the axis of said knuckle pivot.

In witness whereof, we have hereunto set our hands and seals in the presence of two witnesses.

FRANCIS A. MESSLER. [L. S.]
MAURICE BOLLSTROM. [L. S.]

Witnesses:
HENRY F. JACOBS,
CLAUD A. LOCKWOOD.